(12) United States Patent
Huot et al.

(10) Patent No.: US 11,447,240 B2
(45) Date of Patent: Sep. 20, 2022

(54) METHOD OF PROTECTING A MARGIN FOR CONTROLLING THE YAW ATTITUDE OF A HYBRID HELICOPTER, AND A HYBRID HELICOPTER

(71) Applicant: AIRBUS HELICOPTERS, Marignane (FR)

(72) Inventors: Remy Huot, Marseilles (FR); Paul Eglin, Roquefort la Bedoule (FR)

(73) Assignee: AIRBUS HELICOPTERS, Marignane (FR)

(*) Notice: Subject to any disclaimer, the term of this patent is extended or adjusted under 35 U.S.C. 154(b) by 99 days.

(21) Appl. No.: 17/173,300

(22) Filed: Feb. 11, 2021

(65) Prior Publication Data
US 2021/0291974 A1 Sep. 23, 2021

(30) Foreign Application Priority Data

Mar. 17, 2020 (FR) .................................. FR2002606

(51) Int. Cl.
  *B64C 27/26* (2006.01)
  *B64C 27/82* (2006.01)
  *G05D 1/08* (2006.01)

(52) U.S. Cl.
  CPC .............. *B64C 27/26* (2013.01); *B64C 27/82* (2013.01); *G05D 1/0858* (2013.01); *B64C 2027/8236* (2013.01)

(58) Field of Classification Search
  CPC . B64C 27/26; B64C 27/82; B64C 2727/8236; B64C 27/57; B64C 27/22;

(Continued)

(56) References Cited

U.S. PATENT DOCUMENTS 6,513,752 B2 * 2/2003 Carter, Jr. ............... B64C 27/82
244/6
8,052,094 B2 11/2011 Roesch
(Continued)

FOREIGN PATENT DOCUMENTS

CN 108045572 A 5/2018
CN 109665096 A 4/2019
(Continued)

OTHER PUBLICATIONS

French Search Report for French Application No. FR2002606, Completed by the French Patent Office, dated Nov. 9, 2020, 9 pages.

*Primary Examiner* — Joshua J Michener
*Assistant Examiner* — Cindi M Curry
(74) *Attorney, Agent, or Firm* — Brooks Kushman P.C.

(57) ABSTRACT

A method of protecting a margin for controlling the yaw attitude of a hybrid helicopter that includes a lift rotor as well as at least one first propeller and at least one second propeller. A thrust control is configured to generate at least a first order issued to increase a first pitch of first blades of the first propeller and a second pitch of second blades of the second propeller. After a first order has been issued, the method includes an inhibition step for having a control computer inhibit the first order when a yaw attitude control margin, with regard to an envelope delimiting a flight control domain, is and/or will be less than or equal to a threshold.

11 Claims, 3 Drawing Sheets

(58) Field of Classification Search
CPC ....... B64C 13/16; B64C 19/00; B64C 11/305; B64C 13/18; B64C 27/08; B64C 27/28; B64C 11/46; B64C 27/10; G05D 1/0858; G05D 1/0077; B64D 45/00; B64D 27/24; B64D 35/06; G01C 23/00

See application file for complete search history.

(56) References Cited

U.S. PATENT DOCUMENTS

| | | |
|---|---|---|
| 8,113,460 B2 | 2/2012 | Roesch |
| 8,170,728 B2 | 5/2012 | Roesch |
| 8,181,901 B2 | 5/2012 | Roesch |
| 8,568,096 B2 | 10/2013 | Eglin |
| 2010/0065677 A1* | 3/2010 | Ferrier .................... B64C 27/26 244/6 |
| 2010/0243792 A1 | 9/2010 | Queiras et al. |
| 2010/0308154 A1 | 12/2010 | Gemmati et al. |
| 2010/0310371 A1 | 12/2010 | Eglin |
| 2013/0134256 A1* | 5/2013 | Gaillard .................. B64C 27/82 244/17.21 |
| 2014/0034774 A1* | 2/2014 | Ferrier .................... B64C 27/08 244/6 |
| 2016/0200421 A1* | 7/2016 | Morrison ............... B64D 27/24 244/17.23 |
| 2021/0163125 A1* | 6/2021 | Barais ..................... B64C 27/26 |
| 2021/0323659 A1* | 10/2021 | Zhang ..................... B64C 27/82 |

FOREIGN PATENT DOCUMENTS

| | | | |
|---|---|---|---|
| FR | 2943620 A1 | 10/2010 | |
| FR | 2946315 A1 | 12/2010 | |
| FR | 2946316 A1 * | 12/2010 | ............ B64C 27/22 |
| FR | 2946316 A1 | 12/2010 | |
| FR | 3071223 A1 * | 3/2019 | ............ B64C 27/82 |
| RU | 2579235 C1 | 4/2016 | |

* cited by examiner

METHOD OF PROTECTING A MARGIN FOR CONTROLLING THE YAW ATTITUDE OF A HYBRID HELICOPTER, AND A HYBRID HELICOPTER

CROSS-REFERENCE TO RELATED APPLICATIONS

This application claims priority to French patent application No. FR 20 02606 filed on Mar. 17, 2020, the disclosure of which is incorporated in its entirety by reference herein.

BACKGROUND OF THE INVENTION

(1) Field of the Invention

The present invention relates to a method of protecting a margin for controlling the yaw attitude of a hybrid helicopter, and also to a hybrid helicopter applying this method. The invention lies in the technical field of control systems for a hybrid helicopter, in particular for controlling a hybrid helicopter in yaw.

The project leading to this invention received funding from the European Union Framework Programme for Research and Innovation Horizon 2020, through the grant agreement CleanSky 2 No. "GAM-FRC-2014-001 Issue E".

(2) Description of Related Art

One type of rotorcraft may, due to its specificity and for convenience, be referred to as a "hybrid helicopter". A hybrid helicopter has an airframe carrying at least one rotary wing provided with a rotor, that rotor being referred to, for convenience, as a "lift rotor" due to a function it performs. The lift rotor participates at least in providing lift for the aircraft, and indeed can also participate in providing forward propulsion for it.

A hybrid helicopter further includes at least one propeller, possibly of the puller propeller type or of the pusher propeller type. For example, the hybrid rotorcraft may be provided with at least two propellers arranged transversely on either side of the fuselage.

Furthermore, a hybrid helicopter includes a power plant for setting in motion each propeller and the lift rotor, optionally continuously except during failure or during testing.

To pilot a hybrid helicopter, a pilot of the hybrid helicopter can operate a first control and a second control for respectively collectively and cyclically controlling the pitch of the blades of the lift rotor, e.g. via a mechanical and/or electrical architecture. The first control is referred to, for convenience, as the "collective pitch control" and often takes the form of a lever referred to as the "collective pitch lever". The second control is referred to, for convenience, as the "cyclic pitch control" and often takes the form of a stick referred to as the "cyclic stick".

In particular on a hybrid helicopter having at least two propellers situated on either side of the fuselage, the pitch of the blades of each propeller is a function of a mean pitch component and of a differential pitch component. Thus, the first pitch of the first blades of a first propeller may be equal to the sum of the mean pitch component plus the differential pitch component, while the second pitch of the second blades of a second propeller may be equal to the mean pitch component minus the differential pitch component. Furthermore, the mean pitch component may be equal to the half-sum of the first and second pitches of the two propellers, while the differential pitch component may be equal to the half-difference of the first and second pitches of the two propellers.

In this situation, the hybrid helicopter includes at least one thrust control suitable for modifying the value of the mean pitch component, e.g. via a mechanical and/or electrical architecture.

For example, the thrust control may be in the form of a lever or of a button that transmits an analog or digital or indeed optical signal, to one or more actuators. In one example, such a button may have at least three discrete states, namely a "beep+" first state requesting an increase in the value of the mean pitch component, a "beep−" second state requesting a reduction in the value of the mean pitch component, and a third state requesting no change in the value of the mean pitch component. The pitches of the blades of the propellers are then increased so long as a pilot positions the button in its first state. In another example, the button may be in the form of a knurled wheel that transmits an analog signal to at least one actuator for the purpose of finely adjusting the mean pitch component of the pitches of the first and second blades.

Furthermore, steering or "directional" control functions, in particular for yaw control, can be performed by using a yaw control suitable for modifying the value of the differential pitch component. For example, such a yaw control may comprise pedals connected via a mechanical and/or electrical architecture to the propellers. The pedals make it possible to adjust the value of the differential pitch component.

Examples of hybrid helicopters are disclosed, for example, in Documents U.S. Pat. Nos. 8,181,901, 8,170,728, 8,052,094, and 8,113,460.

The total pitch of the propellers may be bounded in order to guarantee that the hybrid helicopter can attain target performance, and/or maneuverability, and/or resistance to aerodynamic loads.

To this end, the hybrid helicopter may include members for reducing the authority of the yaw control as the mean pitch component increases, and vice versa. Thus, the same movement of the yaw control induces different variations in the differential pitch component as a function of the value of the mean pitch component.

In addition, abutments or "stops" can limit the movement of the yaw control.

In a flight control diagram that, along the abscissa axis, plots the pitch of a first propeller situated on a first side of the aircraft as seen by a pilot of the hybrid helicopter, and, up the ordinate axis, plots the pitch of a second propeller situated on a second side of the hybrid helicopter as seen by the pilot, those pitches can then be kept within a domain delimited by a single envelope. The single envelope can be funnel-shaped, with the funnel tapering as the total pitches increase, and, for example, it can be trapezium-shaped or of some more complex shape.

Due to such a shape for the envelope bounding the total pitch of each propeller, the margin for yaw maneuvering may be narrow during rapid acceleration, e.g. on going from a phase of hovering flight to a phase of high-speed forward flight. During hovering, the pilot acts on the yaw control for keeping the hybrid helicopter in a stationary position. The yaw control is not in abutment against a stop. To reach the high-speed forward flight phase, the pilot acts on the thrust control. During a transient phase, the mean pitch component of the pitches of the propellers are increased considerably, thereby, de facto, inducing an increase in the total pitches of the first and second propeller blades. In parallel, the pilot needs to act on the yaw control in order to maintain the yaw attitude of the hybrid helicopter since the authority of the yaw control decreases as the mean pitch component of the pitches of the propellers increase. The total pitches of the first and second propeller blades come closer to the edges of the envelope, with the yaw control coming closer to one of its stops. The margin for modifying the differential pitch components can therefore be narrow, and can transiently impart a yaw attitude control margin that is narrow.

In order to increase freedom for yaw maneuvering during the transient period, the pilot can either reduce the collective pitch of the blades of the lift rotor temporarily so as to reduce the torque exerted by the lift rotor on the airframe of the hybrid helicopter, or else can reduce the mean pitch component of the pitches of the first and second propeller blades.

Document FR 2 946 315 discloses a control and regulation method for a rotorcraft having a main lift rotor, at least one variable-pitch propeller, and at least one power plant for driving the main rotor and each propeller. That method consists in generating at least one mean pitch setpoint for the mean pitch component of each propeller as a function of a control order. In that method, various different operating modes are applicable. In a direct mode, the value of the mean pitch component results directly from the control order. In a forced mode, in the event of the main rotor autorotating, the mean pitch is forced automatically under control of the pilot to a computed pitch value. In a regulated mode, the power consumed by the propeller(s) is regulated as a function of a power setpoint from a thrust control for varying thrust. In a protected mode that can be activated while operating in the various operating modes other than forced mode, the mean pitch component setpoint is reduced automatically in the event of at least one of various limiting physical parameters reaching or exceeding its corresponding limit.

Document FR 2 946 316 discloses a hybrid helicopter provided with yaw control means suitable for generating an original order for modifying the yaw attitude of the hybrid helicopter by increasing the pitch of the blades of one propeller and by decreasing the pitch of the blades of another propeller. Furthermore, in the method disclosed, the original order is optimized as a function of the position of a thrust control so as to obtain an optimized yaw control order that is transmitted to the propellers.

Documents FR 2 943 620 A1, CN 108 045 572 A, CN 109 665 096 A, and RU 2 579 235 C1 are also known.

BRIEF SUMMARY OF THE INVENTION

An object of the present invention is therefore to propose an innovative method that aims to optimize the margin for controlling the yaw attitude of a hybrid helicopter during a phase of acceleration between a phase of hovering flight and a phase of cruising flight.

Thus, the invention provides a method of protecting a margin for controlling the yaw attitude of a hybrid helicopter, the hybrid helicopter including a lift rotor arranged above a fuselage as well as at least one first propeller and at least one second propeller, which propellers are placed on either side of the fuselage. Said hybrid helicopter has a thrust control configured to generate at least a first order or a second order for modifying a first pitch of first blades of the first propeller and a second pitch of second blades of the second propeller, e.g. by the same quantity, said hybrid helicopter having a yaw control configured to modify the yaw attitude of said hybrid helicopter by increasing the first pitch of said first blades and by reducing the second pitch of said second blades.

Furthermore, the method includes a protection phase comprising the following step: after the first order has been issued for increasing the first pitch and the second pitch, e.g. by the same quantity, having a control computer inhibit the first order when said hybrid helicopter reaches an operating point for which a yaw attitude control margin is less than or equal to a threshold and/or for which a prediction of said yaw attitude control margin that will be reached within a predetermined time interval is less than or equal to the threshold.

The expression "an operating point for which a yaw attitude control margin is less than or equal to a threshold and/or for which a prediction of said yaw attitude control margin that will be reached within a predetermined time interval is less than or equal to the threshold" refers to:

an operating point for which a yaw attitude control margin is less than or equal to a threshold;

or an operating point for which a prediction of said yaw attitude control margin that will be reached within a predetermined time interval is less than or equal to the threshold;

or an operating point for which a yaw attitude control margin is less than or equal to a threshold and for which a prediction of said yaw attitude control margin that will be reached within a predetermined time interval is less than or equal to the threshold.

Therefore, in this method, if the pilot moves the thrust control to accelerate the hybrid helicopter in a forward direction, the control computer acts, at each iteration of the method, to check that the yaw control has a yaw attitude control margin that is not less than a minimum and that is thus sufficient for the pilot to be able to pilot the aircraft. If the yaw control does have such a margin, the control computer processes the first order in compliance with instructions stored in a memory, and transmits a signal to at least one actuator so as to increase both the first pitch and the second pitch. If the yaw control does not have such a margin, the control computer inhibits the thrust control temporarily in order to avoid the yaw control being in abutment against a stop. The term "inhibits" means that the control computer does not take the first order into account.

In alternative or additional manner, the control computer may, at each iteration of the method, check that the yaw control is going to have not less than a minimum yaw attitude control margin within a predetermined time interval, e.g. within one or two seconds. If the control computer determines that the first order is going to generate a yaw attitude control margin that is too narrow within said time interval, the control computer inhibits the thrust control temporarily.

By way of illustration, the pilot may move the thrust control to go from a phase of hovering flight to a phase of high-speed flight. The mean pitch component increases, thereby inducing an increase both in the first value of the first pitch of the first blades and also in the second value of the second pitch of the second blades. The forward speed of the hybrid helicopter increases in turn, but, de facto, with a slight time-lag. Whenever the control computer detects, as a function of a logic stored in a memory, that the hybrid helicopter is reaching an operating point for which the yaw attitude control margin is too narrow or will be too narrow within a short term, the control computer inhibits the first order. The first pitch of the first blades and the second pitch of the second blades no longer increase, ignoring any variation in the differential pitch component. In parallel, the pilot can reduce the collective pitch of the blades of the lift rotor, thereby inducing a reduction in the torque exerted by the lift rotor on the fuselage. Consequently, the pilot can move the yaw control in order to reduce the differential pitch component to compensate for this. As a de facto result, the yaw attitude control margin increases. As soon as the yaw attitude control margin is no longer or is no longer in danger of being less than or equal to the required threshold, any subsequent first order is no longer inhibited.

This method thus makes it possible to retain at least some minimum margin of maneuverability for the yaw control by preventing the pilot from accelerating the hybrid helicopter when certain stored conditions are satisfied. This method makes it possible to avoid having a narrow margin of maneuverability when the propellers still need to provide an antitorque function to a large extent.

This method may also include one or more of the following characteristics.

Thus in one option, the method includes a determination step for determining a rate of increase of a mean pitch component of the first pitch and of said second pitch, said protection phase being initiated only if said rate of increase is greater than a predetermined value.

The expression "rate of increase" means the speed or rate at which the mean pitch component is increased, where applicable. For example, the predetermined value may be determined by trials and/or simulations. For example, the rate of increase may be estimated in degrees of pitch per minute. In this option, the protection phase may be inhibited in the presence of a slow increase of the mean pitch component of the first pitch and of the second pitch. Merely by way of illustration, if the mean pitch component increases, for example, at a rate of one degree per minute, the protection phase may be inhibited. Indeed, the time lag between the increase in the mean pitch component and the increase in the true air speed can then have little impact on the yaw attitude control margin.

Alternatively, the protection phase may always be active.

In one possibility, the yaw attitude control margin may be expressed in degrees of pitch, said threshold being equal to a predetermined percentage of a pitch control range at a current operating point, said current operating point being defined by a first current value of the first pitch and by a second current value of the second pitch, which current values are reached during a current iteration.

The prediction of the yaw attitude control margin represents a predicted value of the yaw attitude control margin that the yaw attitude control margin will potentially reach within the predetermined time interval if the conditions remain unchanged. At each iteration, the prediction of the yaw attitude control margin may be assessed by the control computer by determining a predictive operating point that is defined by a first predicted value of the first pitch and a second predicted value of the second pitch being reached. For example, the first predicted value P1 may be equal to the first current value PAS1CUR plus the product of the time interval DT multiplied by a rate V1 at which the first pitch is changing, i.e.: P1=PAS1CUR+DT×V1. Similarly, the second predicted value P2 may be equal to the second current value PAS2CUR plus the product of the time interval DT multiplied by a rate V2 at which the second pitch is changing, i.e.: P2=PAS2CUR+DT×V2.

The yaw attitude control margin is expressed with regard to the real pitches of the propellers. When the hybrid helicopter includes series actuators for automatically controlling yaw, and when the series actuators are centered, then the yaw attitude control margin is the direct image of the margin of the yaw control with regard to its stops.

For example, the percentage lies in the range 10% to 20%.

This percentage may be established by trials. Optionally, the percentage may lie in the range 10% to 15%, or in the range 15% to 20%, or in the range 12.5% to 17.5%, or indeed it may be of the order of 15%.

Such a percentage tends to guarantee that the margin for maneuvering the yaw control is sufficient regardless of the situation.

In an example, if the control range is equal to 10 degrees of pitch and if the percentage is equal to 15%, the threshold is equal to 1.5 degrees of pitch. When the hybrid helicopter reaches an operating point where the yaw attitude control margin is less than or equal to or will be less than 1.5 degrees of pitch, the first order is inhibited.

In another aspect, the step of assessing that the yaw attitude control margin with regard to the envelope bounding the authorized flight control domain is less than a threshold may be performed in various different manners. In particular, the yaw attitude control margin is not necessarily computed.

In one possibility, the method may include an assessment phase for determining whether said hybrid helicopter is reaching said operating point for which the yaw attitude control margin is less than or equal to the threshold, said assessment phase including the following steps at each iteration:

determining a current operating point defined by a first current value of the first pitch and by a second current value of the second pitch at a current iteration;

determining that the current operating point lies within a stored set; and determining that said yaw attitude control margin is less than or equal to said threshold when said current operating point lies within said stored set.

At each iteration, a stored set of operating points that are to generate an inhibition of a first order are associated with an envelope delimiting a current flight domain. If the current operating point is present in said set, then the first order is inhibited.

This method is also applicable to predicting the yaw attitude control margin by taking into consideration not the current operating point but rather an operating point that is predicted, e.g. using the above-described method.

In one possibility, the method may include an assessment phase for determining whether said hybrid helicopter is reaching said operating point for which the yaw attitude control margin is less than or equal to the threshold, said assessment phase including the following steps at a computation instant:

determining a current operating point defined by a first current value of the first pitch and by a second current value of the second pitch at a current iteration;

assigning "margin information" to said current operating point, said hybrid helicopter including a memory associating said margin information with each possible operating point; and determining that said yaw attitude control margin with regard to said envelope is less than or equal to said threshold as a function of said margin information.

For each operating point, said "margin information" data is stored in the aircraft. At each computation instant, the control computer consults a memory to determine the stored margin information corresponding to the current operating point under current conditions.

For example, the margin information may be a stored margin that is then compared with the threshold. In an example, the threshold takes the form of a pitch value equal to 15 degrees. If, at the current operating point, the stored margin is also 15 degrees, the first order is inhibited.

In another example, the margin information may comprise two different strings of characters corresponding respectively to a situation in which said yaw attitude control margin with regard to said envelope is less than or equal to said threshold and to a situation in which said yaw attitude control margin with regard to said envelope is greater than said threshold. As a function of the string of characters assigned to the current operating point, the control computer determines the current situation and whether the first order should be applied or inhibited/cancelled.

This method is also applicable to predicting the yaw attitude control margin by taking into consideration not the current operating point but rather an operating point that is predicted, e.g. using the above-described method.

In another aspect, after the control computer has inhibited the first order, said method may include the following step: reducing the first pitch and the second pitch under order from said control computer.

This variant is not confined to inhibiting the first order, but rather it goes further by proposing, conversely, to reduce the mean pitch component of the pitches of the first blades and of the second blades so long as the margin for controlling the attitude has not been restored.

In another aspect, said control computer optionally never inhibits an order of the second order type issued for reducing the first pitch and the second pitch by the same quantity.

The invention further provides a hybrid helicopter, said hybrid helicopter including a lift rotor arranged above a fuselage, at least one first propeller and at least one second propeller, which propellers are placed on either side of the fuselage, said hybrid helicopter having a thrust control configured to generate at least a first order or a second order for using at least one actuator to modify, by the same quantity, a first pitch of first blades of the first propeller and a second pitch of second blades of the second propeller, said hybrid helicopter having a yaw control configured to modify the yaw attitude of said hybrid helicopter by increasing the pitch of said first blades and by reducing the pitch of said second blades.

Said hybrid helicopter includes a control computer in communication with the thrust control, or indeed with said at least one actuator, and configured to apply the above-described method of the invention.

The thrust control and the yaw control may comprise members that are controllable by a pilot in usual manner, and optionally a sensor that detects a control connected to the control computer. For example, the thrust control may comprise a button that is operable by a pilot and that generates an analog or digital signal that varies as a function of the position of said button. In another example, the thrust control may comprise a lever and a position sensor, the position sensor generating an analog or digital signal that varies as a function of the angular or linear position of the lever.

Furthermore, the hybrid helicopter may include at least one actuator or indeed at least two actuators that are in communication with the control computer and that are arranged respectively on at least one control channel that controls the mean pitch component and the differential pitch components of the first pitch of the first blades and of the second pitch of the second blades.

Thus, the thrust control transmits an analog or digital signal to the control computer, the control computer processing this signal so as to control at least one actuator accordingly.

In one aspect, the hybrid helicopter may include a first measurement sensor for measuring the first pitch and a second measurement sensor for measuring the second pitch.

In one aspect, the hybrid helicopter may include a cyclic pitch control for cyclically modifying the pitch of blades of the lift rotor, said cyclic pitch control being provided with a member movable by a pilot, and with a position sensor emitting a position signal, said position signal varying as a function of a movement of the movable member.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
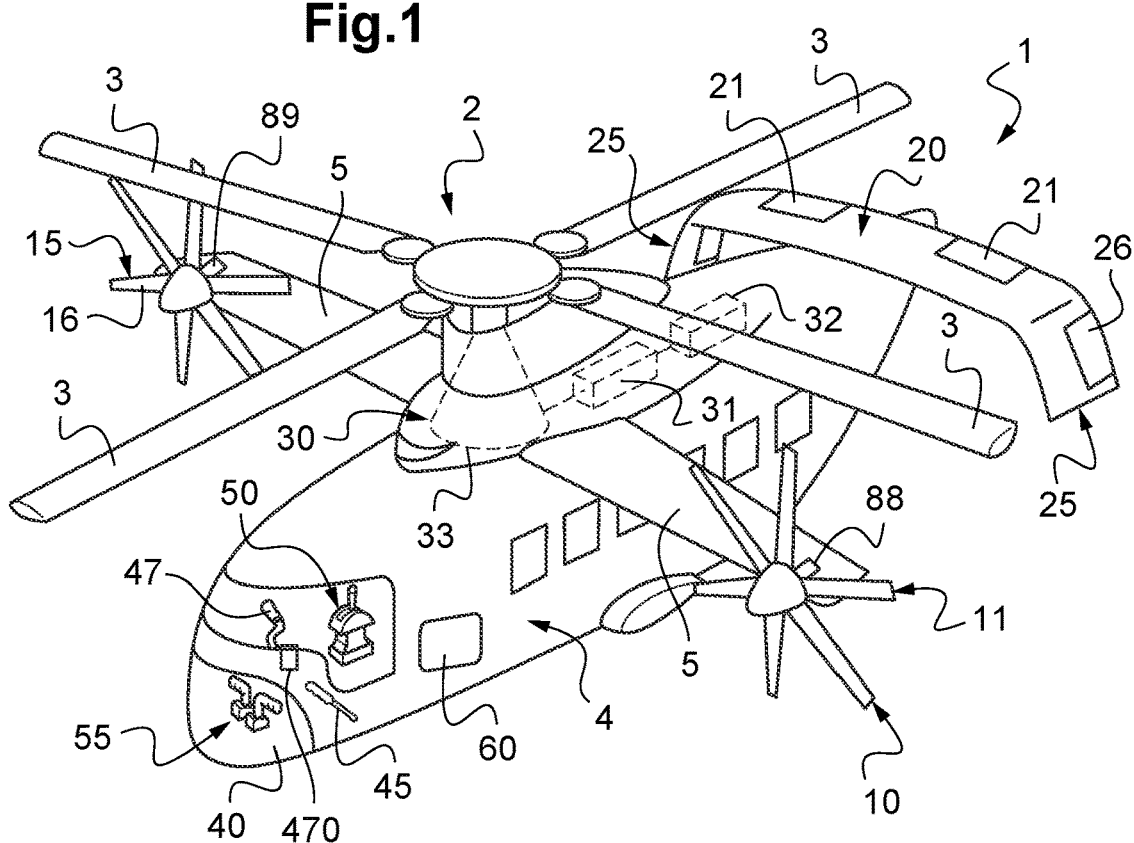
FIG. 1 is a diagrammatic view of a hybrid helicopter of the invention.

FIG. 1 shows a hybrid helicopter 1 of the invention.

This hybrid helicopter 1 has a fuselage 4 above which at least one lift rotor 2 is arranged. The lift rotor 2 is provided with a plurality of blades referred to for convenience as "main blades 3".

In addition, the hybrid helicopter 1 is provided with at least one first propeller 10 and with at least one second propeller 15, the propellers being of the puller type or of the pusher type. The first and second propellers 10, 15 respectively have a plurality of first blades 11 and a plurality of second blades 16. The first propeller 10 and the second propeller 15 may be disposed laterally relative to the fuselage 4, and in particular on either side of an anteroposterior plane of the hybrid helicopter 1. In FIG. 1, the sides on which the first and second propellers 10, 15 are arranged may be reversed. The first and second propellers 10, 15 are optionally carried by a support 5. Such a support 5 may optionally be aerodynamic. For example, the support 5 comprises a wing as shown in FIG. 1. In FIG. 1, the propellers are placed at the leading edge of a wing. In another example, the propellers are placed at the trailing edge of the wing.

Furthermore, the hybrid helicopter 1 may include surfaces for stabilizing or indeed maneuvering purposes, i.e. stabilizer surfaces and movable control surfaces. For example, for longitudinal (pitch) stability and control, the hybrid helicopter 1 may include at least one substantially horizontal stabilizer 20, optionally provided with movable pitch control surfaces or "elevators" 21. For example, for directional (yaw) stability and control, the hybrid helicopter 1 may include at least one substantially vertical stabilizer 25, optionally provided with movable control surfaces or "rudders" 26. FIG. 1 thus shows a stabilizer assembly that is in the shape of an upside-down U, but the stabilizer assembly may have various shapes without going beyond the ambit of the invention. In another example, the stabilizer assembly may be H-shaped.

Furthermore, the hybrid helicopter 1 includes a power plant 30 for delivering power to the lift rotor 2 and to each propeller 10, 15. For this purpose, the power plant 30 includes at least one engine 31 that is controlled by a usual engine computer 32.

The term "computer" is used below to mean a unit that may, for example, comprise at least one processor and at least one memory, at least one integrated circuit, at least one programmable system, or at least one logic circuit, these examples not limiting the scope given to the expression "computer". The term "processor" may be used equally well to mean a central processing unit (CPU), a graphics processing unit (GPU), a digital signal processor (DSP), a microcontroller, etc.

In addition, for example inside an interconnection system, the power plant 30 may further include at least one gearbox, at least one shaft, and/or at least one member for interconnecting two members in rotation, etc. For example, one or more engines 31 are connected mechanically via one or more mechanical linkage channels to a main gearbox 33 that drives the lift rotor 2 in rotation. Furthermore, the main gearbox 33 may be connected mechanically via respective shafts to side gearboxes, one for each of the propellers 10, 15, which side gearboxes are then in turn connected to the corresponding propellers 10, 15.

The speeds of rotation of the outlets of the engine(s), of the propellers, of the lift rotor, and of the mechanical interconnection system are optionally mutually proportional, with the proportionality ratio optionally being constant regardless of the flight configuration of the hybrid helicopter under normal operating conditions, i.e. except for failure, testing or training situations.

Furthermore, the hybrid helicopter 1 may include various controls for being piloted by a human pilot.

In particular, the hybrid helicopter 1 may include a control system for collectively and cyclically controlling the pitch of the main blades 3. Such a control system may, for example, include a set of swashplates. Thus, at each instant, the pitch of the main blades 3 may be equal to the sum of a collective pitch that is identical for all of the main blades 3 and of a cyclic pitch that varies as a function of the azimuth position of each main blade 3. The pitch of the main blades 3 is referred to as the "main pitch" so as to be clearly distinguished from the pitches of the other blades.

The hybrid helicopter 1 may then include a collective pitch control 45 that acts on at least one mechanical and/or electrical channel of the control system to cause the main pitch of the main blades 3 to vary collectively, where applicable via the set of swashplates. For example, the collective pitch control 45 may comprise a lever.

Similarly, the hybrid helicopter 1 may include a cyclic pitch control 47 that acts on one or more mechanical and/or electrical control channels of the control system to cause the main pitch of the main blades 3 to vary cyclically, where applicable via the set of swashplates. In addition, the cyclic pitch control 47 may be provided with a position sensor 470 that emits an analog, digital, or optical signal that varies as a function of the position of a moving member of the position sensor. For example, the cyclic pitch control 47 comprises a stick and a position sensor including at least two angular position sensors for assessing a position of the stick, such as, for example, potentiometers.

In usual manner, the hybrid helicopter 1 may include controls connected to the control system for controlling the pitch of the first blades 11 and the pitch of the second blades 16. At each instant, the first pitch of the first blades 11 of the first propeller 10 may be equal to the sum of a mean pitch component and of a differential pitch component, while the second pitch of the second blades 16 of the second propeller 15 is equal to the difference between the mean pitch component and the differential pitch component.

Optionally, the hybrid helicopter 1 includes a first measurement sensor 88 for measuring the first value of the first pitch and a second measurement sensor 89 for measuring the second value of the second pitch. For example, the first measurement sensor 88 includes a position sensor that emits an analog, digital, or optical signal that varies as a function of the position of a control shaft for controlling the pitch of the first blades 11. Similarly, the second sensor 89 may include a position sensor that emits an analog, digital, or optical signal that varies as a function of the position of a control shaft for controlling the pitch of the second blades 16.

In usual manner, the hybrid helicopter 1 may include a thrust control 50 that acts on one or more mechanical and/or electrical control channels of the control system to cause the mean pitch component to vary, e.g. so as to control a forward speed of the hybrid helicopter 1. FIG. 1 shows a thrust control 50 of the lever type, but the thrust control may also, for example, take the form of a button generating a digital signal or an analog signal.

Similarly, the hybrid helicopter 1 may include a yaw control 55 that that acts on one or more mechanical and/or electrical control channels of the control system to cause the differential pitch component of the pitch of the first blades 11 and of the pitch of the second blades 16 to vary.

In addition, the control system may include a control computer 60 in communication at least with the thrust control 50, and with at least one actuator for applying the method of the invention.

Figure 2:
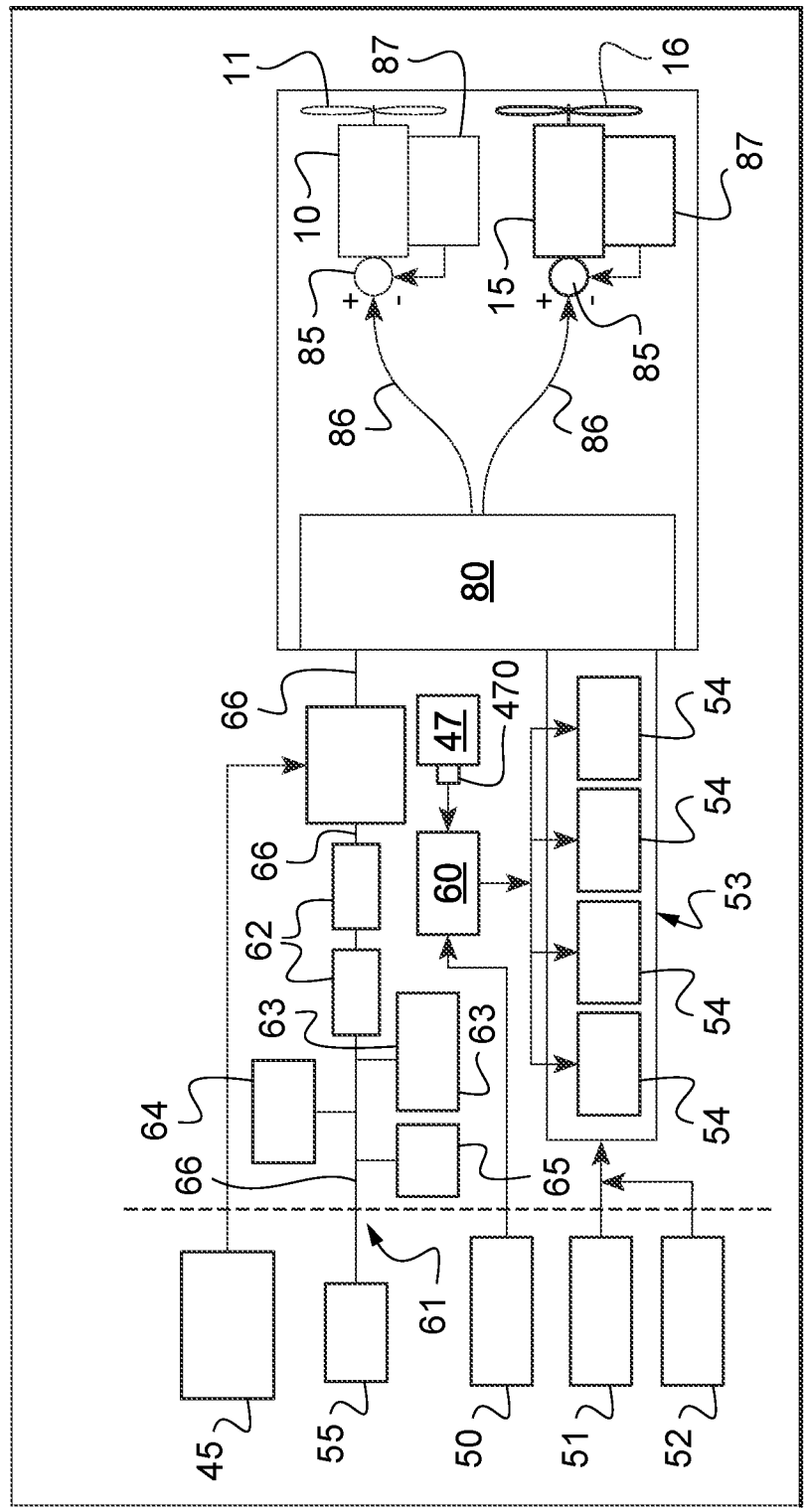
FIG. 2 is a diagrammatic view of a first control architecture for controlling the propellers of a hybrid helicopter of the invention.

FIG. 2 shows an example of a control system for controlling the propellers 10, 15.

In this control system, the yaw control 55 is connected via a mechanical first main channel 61 to a mechanical mixing unit 80. This mechanical first main channel 61 may include at least one rigid link 66, at least one yaw series actuator 62, and members 63 generating friction forces. For example, a rigid link may take the form of a connecting rod or of some equivalent means. A usual device 64 may also damp the movements of the yaw control 55. At least one yaw trim actuator 65 may be arranged in parallel with the mechanical first main channel 61. Each yaw trim actuator 65 and each yaw series actuator 62 is controlled by the control computer 60.

In addition, the mechanical first main channel 61 may include an adjustment unit 67 that, for example, makes it possible to modify the authority of the yaw control 55 as a function of an action to move the collective pitch control 45 and/or of an action to move the thrust control 50 directly or via the control computer 60. The control computer 60 may also act on the authority of the yaw control 55, e.g. by controlling the yaw series actuators 62.

In addition, for each propeller, 10, 15, the mixing unit 80 is coupled to a control rod for controlling a hydraulic valve 85 via a linkage secondary channel 86, and, for example, via a ball control. As a function of the orders given by the pilot, the control rods are moved so that the hydraulic valves 85 connect servo-controls to the hydraulic circuit of the hybrid helicopter 1 so as to modify the first pitch of the first blades 11 and the second pitch of the second blades 16. A system 87 may modify the orders transmitted by the mixing unit 80. For example, such a system 87 includes a repeater rod for the hydraulic valve 85, which rod can be moved under order of the control computer 60.

Furthermore, the thrust control 50 is coupled to the mixing unit 80, e.g. via a linkage second main channel 53, the linkage second main channel 53 including at least one actuator 54, e.g. of the thrust series actuator type, connected mechanically to the mixing unit 80. Each thrust series actuator 54 may receive an analog, digital, or optical signal issued by the control computer 60 under order from the thrust control 50. As a result, the thrust control 50 issues an analog, digital, or optical signal that is transmitted to the control computer 60, which control computer 60 controls one or more thrust series actuators 54 accordingly.

Optionally, a backup control 51 may also be put in place, and, for example, a backup control connected mechanically to the linkage second main channel 53. In one example, a lever may move the linkage second main channel 53.

Optionally, a movement prevention control 52 may be considered for preventing the backup control 51 from moving.

Under such conditions, the mixing unit 80 sums the order for varying the mean pitch component that is given by the thrust control 50 via the thrust series actuators 54, and the order for varying the differential pitch component that is given by the yaw control 55 or indeed via the yaw series actuators. More precisely, when the thrust control 50 is moved, a control signal is transmitted to the control computer 60. The control computer 60 then optionally controls one or more thrust series actuators 54 for setting in motion the mixing unit 80 in order to modify the mean pitch component of the first blades 11 and of the second blades 16.

Figure 3:
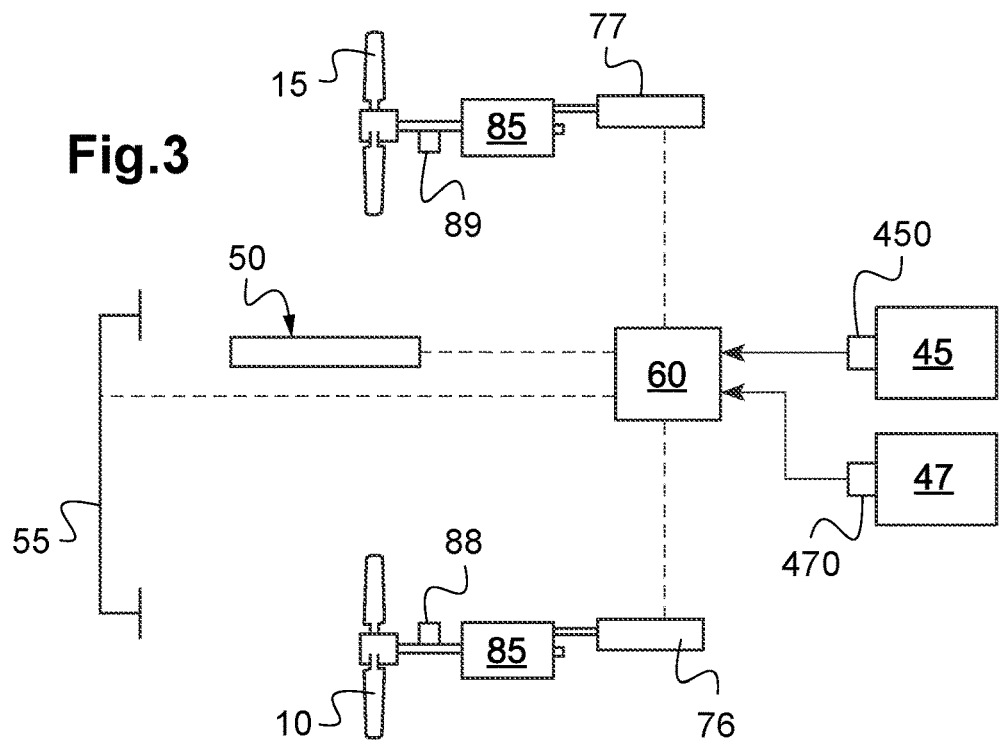
FIG. 3 is a diagrammatic view of a second control architecture for controlling the propellers of a hybrid helicopter of the invention.

FIG. 3 shows another example of a control system for controlling the propellers 10, 15.

In this example, the yaw control 55, the thrust control 50, the collective pitch control 45 and the cyclic pitch control 47 communicate with the control computer 60. The control computer 60 is in communication with actuators 76, 77 that are connected to respective ones of the hydraulic valves 85.

The control computer 60 then applies laws stored in a memory for controlling the actuators 76, 77 as a function of the signals issued by the yaw control 55 and by the thrust control 50, or indeed by the collective pitch control 45 and/or by the cyclic pitch control 47.

More precisely, when the thrust control 50 is moved, a control signal is transmitted to the control computer 60. The control computer 60 then optionally controls the actuators 76, 77 in order to modify the mean pitch component of the first blades 11 and of the second blades 16.

The control systems of FIGS. 2 and 3 are given by way of illustration. Reference can be made to the literature in order to obtain information about the possible architectures, and, for example, to Document FR 2 946 315.

Figure 5:
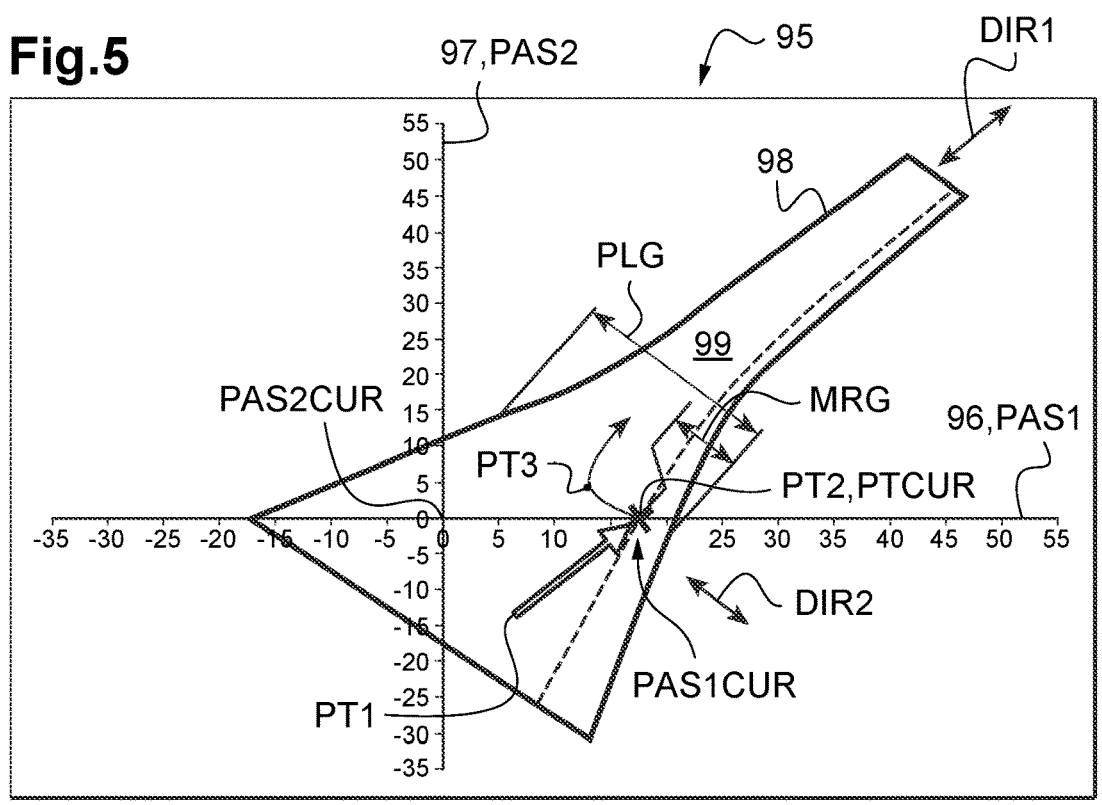
FIG. 5 is a diagram showing the method of the invention.

In another aspect, FIG. 5 shows a diagram that plots the first pitch PAS1 of the first blades 11 along the abscissa axis, and the second pitch PAS2 of the second blades up the ordinate axis. The first pitch PAS1 and the second pitch PAS2 are kept within an envelope 98 that delimits a flight control domain 99. At each computation iteration, the first current value PAS1CUR of the first pitch PAS1 and the second current value PAS2CUR of the current second pitch PAS2 define a current operating point that is present within the flight control domain 99 delimited by the envelope 98.

Said flight control domain 99 is bounded in a first direction DIR1 by limiting the amplitude of movement of the thrust control 50 and in a second direction DIR2 by limiting the amplitude of movement of the yaw control 55. In addition, the authority of the yaw control 55 decreases as the mean pitch component increases, thereby imparting to the envelope 98 a tapering shape going from bottom to top and from left to right in FIG. 5.

Figure 4:
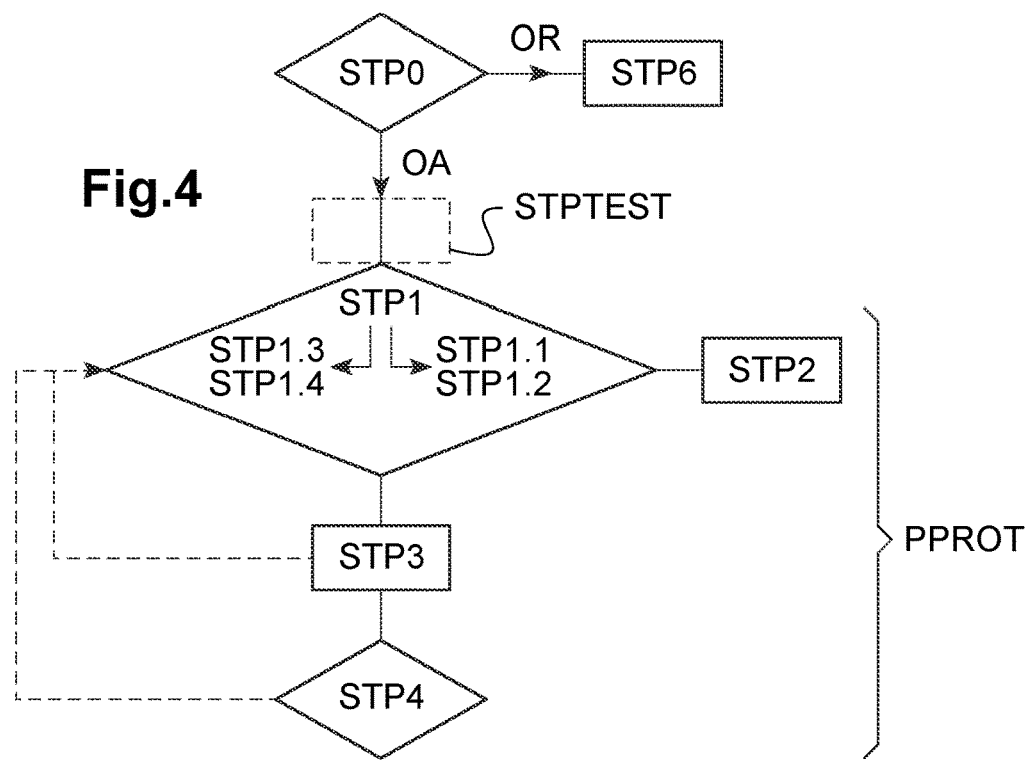
FIG. 4 is a flow chart showing the method of the invention.

Independently of the architecture of the control system, the control computer 60 is configured to apply the method of the invention shown in FIG. 4.

During a step STP0, the thrust control 50 is moved by the pilot to issue a modification order for modifying the mean pitch component of the first pitch PAST of the first blades 11 and of the second pitch PAS2 of the second blades 16.

When said modification order is a first order OA issued for increasing the first pitch and the second pitch, e.g. by the same quantity, and thus for increasing the mean pitch component, a protection phase PPROT is, in one option, automatically implemented by the control computer.

In another option, the method may include a step STPTEST for determining the speed or "rate" of increase of the mean pitch component of the first pitch and of said second pitch. By computation, the control computer 60 determines the rate, referred to as the "rate of increase" at which the mean pitch component increases and then initiates the protection phase PPROT only if the rate of increase is greater than a predetermined value.

Independently of this aspect, during the protection phase PPROT, the control computer 60 acts, during a monitoring step STP1, to assess whether the yaw attitude control margin, with regard to an envelope 98 delimiting a flight control domain 99, is less than or equal to a threshold S and/or will be less than or equal to the threshold S, without necessarily computing said yaw attitude control margin.

As shown in FIG. 5, the yaw attitude control margin MRG may be expressed in degrees of pitch, the threshold S taking the form of a predetermined percentage of a pitch control range PLG at a current operating point PTCUR. For example, the threshold S lies in the range 10 percent (%) of the control range PLG to 20% of said control range PLG. In other words, and with a threshold of 15%, the control computer 60 assesses whether, at the current operating point, the yaw attitude control margin MRG relative to an edge of the envelope 98 is less than or equal to 15% of the control range PLG.

This method may be applied with a predictive operating point that will be reached within a predetermined time interval in view of the rate at which the first pitch and the second pitch are increasing.

With reference to FIG. 4, the control computer 60 can assess whether the yaw attitude control margin is less than or equal to the threshold S in various manners.

In a first alternative, the control computer 60 may store in a memory a "stored set" containing all of the operating points that are considered as not having the required margin. The control computer 60 then determines the current operating point PTCUR by means of the signals issued by the first measurement sensor 88 for measuring the first pitch and by the second measurement sensor 89 for measuring the second pitch. Then, during an analysis step STP1.1, the control computer 60 determines whether the current operating point lies within the stored set by comparison. Finally, during a decision step STP1.2, the control computer 60 concludes that the yaw attitude control margin is less than or equal to the threshold when the current operating point lies within such a set.

In a second alternative, for each operating point, the control computer may store margin information in a memory, said margin information indicating whether the operating point has the required margin under current conditions.

Then, during an assignment step STP1.3, the control computer 60 assigns to the current operating point the associated margin information in its memory, and then, during a step STP1.4, the control computer 60 deduces from this whether the yaw attitude control margin with regard to said envelope 98 is less than or equal to said threshold.

In an example, the string of characters YES is assigned to an operating point that has an acceptable margin, the string of characters NO being assigned to said operating point if it does not have an acceptable margin. If the current operating point is associated with the string of characters NO, the control computer 60 deduces from this that the yaw attitude control margin with regard to said envelope 98 is less than or equal to said threshold.

In another example, margin information takes the form of a percentage that is compared with the threshold that itself takes the form of a percentage. If the percentage assigned to the current operating point is less than or equal to the threshold, the control computer 60 deduces from this that the yaw attitude control margin with regard to said envelope 98 is less than or equal to said threshold.

These alternatives are given by way of example. In the same way, the control computer may determine whether a predicted value of the yaw attitude control margin is less than or equal to the threshold S.

Regardless of the alternative, so long as the current yaw attitude control margin is greater than the threshold S, and optionally so long as the prediction of the yaw attitude control margin is greater than the threshold S, then during an acceleration step STP2, the control computer 60 issues a digital, analog, or optical acceleration signal for increasing the mean pitch component. For example, this acceleration signal is transmitted to a series actuator 54 as shown in FIG. 2 or to the actuators 76, 77 as shown in FIG. 3.

Otherwise, during an inhibition step STP3, the control computer 60 inhibits the first order OA. The mean pitch component is then temporarily no longer increased.

FIG. 5 explains this mode of operation. During hovering flight, the hybrid helicopter 1 operates at the first operating point PT1. When the pilot moves the thrust control 50, the mean pitch component increases. The second operating point PT2 is reached. In order to keep an acceptable yaw attitude control margin, the mean pitch component is no longer increased. Naturally, the pilot moves the yaw control 55, thereby moving the operating point away from the right edge of the envelope 98 towards a third operating point PT3. The hybrid helicopter 1 can then resume accelerating in the forward direction.

With reference to FIG. 4, during an additional step STP4, the control computer 60 may issue a digital, analog, or optical slowing-down signal to at least one actuator for reducing the mean pitch component, contrary to the order issued by the pilot. For example, this slowing-down signal is transmitted to a series actuator 54 as shown in FIG. 2 or to the actuators 76, 77 as shown in FIG. 3.

In another aspect, if the modification order is a second order OR aiming to cause the mean pitch component to be reduced, the control computer 60 does not inhibit said order and processes it normally. The control computer 60 may issue a slowing-down signal.

Naturally, the present invention may be subjected to numerous variations as to its implementation. Although several implementations are described above, it should readily be understood that it is not conceivable to identify exhaustively all possible implementations. It is naturally possible to envisage replacing any of the means described by equivalent means without going beyond the ambit of the present invention.

What is claimed is:

1. A method of protecting a margin for controlling the yaw attitude of a hybrid helicopter, the hybrid helicopter including a lift rotor arranged above a fuselage as well as at least one first propeller and at least one second propeller placed on either side of the fuselage, the hybrid helicopter having a thrust control configured to generate at least a first order or a second order for modifying a first pitch of first blades of the first propeller and a second pitch of second blades of the second propeller, the hybrid helicopter having a yaw control configured to modify the yaw attitude of the hybrid helicopter by increasing the first pitch of the first blades and by reducing the second pitch of the second blades, wherein the method includes a protection phase comprising the following step:

after the first order has been issued for increasing the first pitch and the second pitch, having a control computer inhibit the first order when the hybrid helicopter reaches an operating point for which a yaw attitude control margin is less than or equal to a threshold and/or for which a prediction of the yaw attitude control margin that will be reached within a predetermined time interval is less than or equal to the threshold.

2. The method according to claim 1, wherein the yaw attitude control margin is expressed in degrees of pitch, the threshold being equal to a predetermined percentage of a pitch control range at a current operating point, the current operating point being defined by a first current value of the first pitch and by a second current value of the second pitch, which first and second current values are reached during a current iteration.

3. The method according to claim 2, wherein the percentage lies in the range 10% to 20%.

4. The method according to claim 1, wherein the method includes a determination step for determining a rate of increase of a mean pitch component of the first pitch and of the second pitch, the protection phase being initiated only if the rate of increase is greater than a predetermined value.

5. The method according to claim 1, wherein the method includes an assessment phase for determining whether the hybrid helicopter is reaching the operating point for which the yaw attitude control margin is less than or equal to the threshold, the assessment phase including the following steps:

determining a current operating point defined by a first current value of the first pitch and by a second current value of the second pitch at a current iteration;

determining that the current operating point lies within a stored set; and determining that the yaw attitude control margin is less than or equal to the threshold when the current operating point lies within the stored set.

6. The method according to claim 1, wherein the method includes an assessment phase for determining whether the hybrid helicopter is reaching the operating point for which the yaw attitude control margin is less than or equal to the threshold, the assessment phase including the following steps:

determining a current operating point defined by a first current value of the first pitch and by a second current value of the second pitch at a current iteration;

assigning margin information to the current operating point, the hybrid helicopter including a memory associating the margin information with each possible operating point; and determining that the yaw attitude control margin with regard to the envelope is less than or equal to the threshold as a function of the margin information.

7. The method according to claim 1, wherein after the control computer has inhibited the first order, the method includes the following step: reducing the first pitch and the second pitch under order from the control computer.

8. The method according to claim 1, wherein the control computer never inhibits the second order issued for reducing the first pitch and the second pitch by the same quantity.

9. A hybrid helicopter, the hybrid helicopter including a lift rotor arranged above a fuselage, at least one first propeller and at least one second propeller, which propellers are placed on either side of the fuselage, the hybrid helicopter having a thrust control configured to generate at least a first order or a second order for using at least one actuator to modify, by the same quantity, a first pitch of first blades of the first propeller and a second pitch of second blades of the second propeller, the hybrid helicopter having a yaw control configured to modify the yaw attitude of the hybrid helicopter by increasing the pitch of the first blades and by reducing the pitch of the second blades;

wherein the hybrid helicopter includes a control computer in communication with the thrust control and with the actuator, the control computer being configured to apply the method according to claim 1.

10. The hybrid helicopter according to claim 9, wherein the hybrid helicopter includes a first measurement sensor for measuring the first pitch and a second measurement sensor for measuring the second pitch.

11. The hybrid helicopter according to claim 9, wherein the hybrid helicopter includes a cyclic pitch control for cyclically modifying the pitch of main blades of the lift rotor, the cyclic pitch control being provided with a member movable by a pilot, and with a position sensor emitting a position signal, the position signal varying as a function of a movement of the movable member.

\* \* \* \* \*